UNITED STATES PATENT OFFICE.

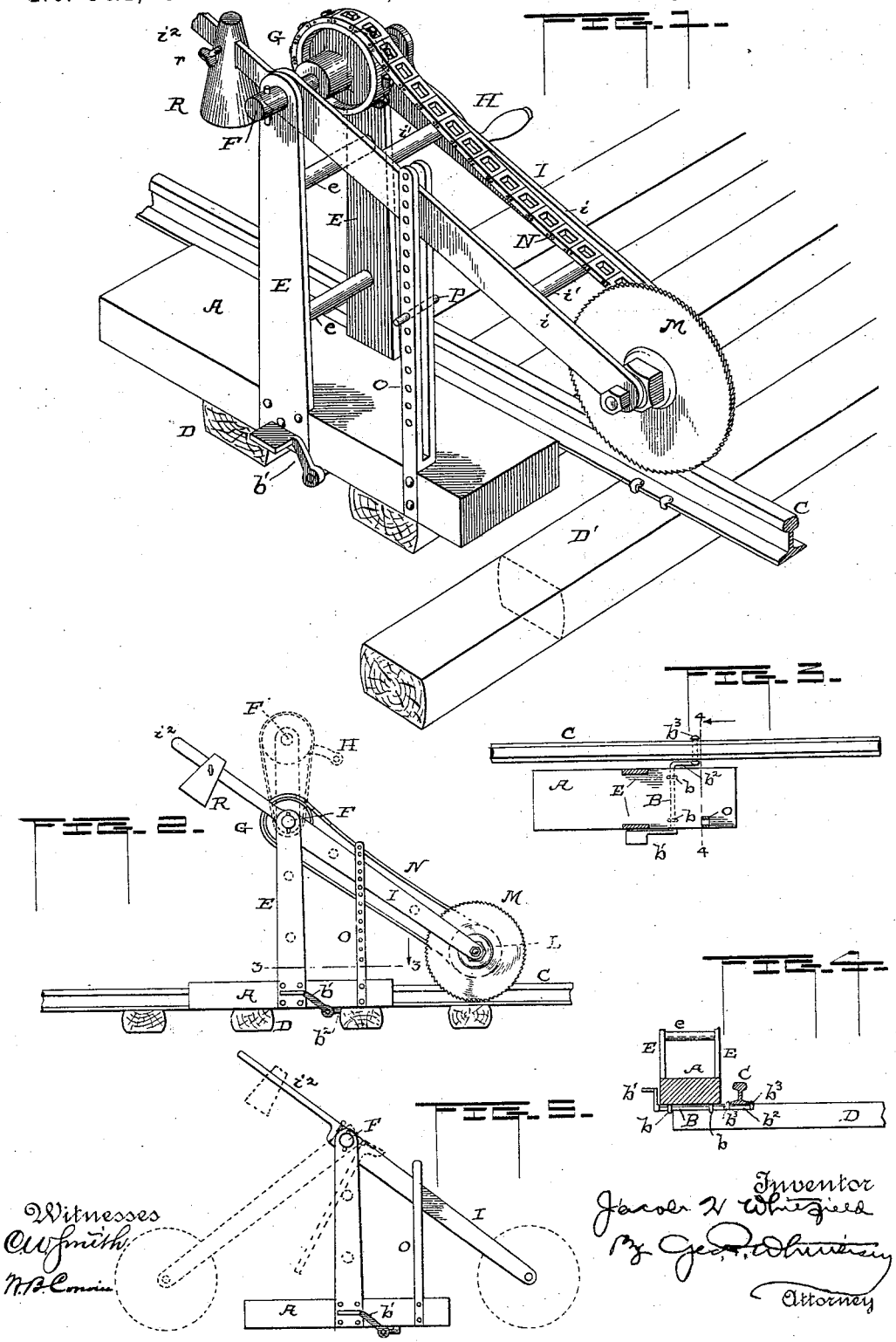

JACOB HALL WHITFIELD, OF NEW BRUNSWICK, NEW JERSEY.

PORTABLE SAWING-MACHINE.

SPECIFICATION forming part of Letters Patent No. 564,297, dated July 21, 1896.

Application filed April 20, 1896. Serial No. 588,324. (No model.)

*To all whom it may concern:*

Be it known that I, JACOB HALL WHITFIELD, a citizen of the United States, residing at New Brunswick, in the county of Middlesex and State of New Jersey, have invented certain new and useful Improvements in Portable Sawing-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to portable sawing-machines; and its object is to provide such a machine for the use of railroad-track layers and repairers, for the purpose of sawing off to standard length the projecting ends of ties after they have been laid in the track. Ordinarily, this work is done by means of a two-handled crosscut-saw, but this mode is slow and requires a considerable quantity of the ballast to be removed before the saw can be used. Moreover, such a saw cannot be used in the angles of frogs, cross-overs, or other confined places.

My invention consists in a circular saw mounted in a vertically-swinging frame which is pivoted to uprights on a solid base-plate adapted to rest on the ties or the track adjacent to the tie which is to be cut. The saw is driven by sprockets and chain-belt gearing, and the frame projects beyond the end of the base-plate so that the saw can drop down in between the rails when necessary. The machine is held in place by a clamp, which is operated by a treadle and engages with the adjacent rail.

In the drawings, Figure 1 is a perspective view of my improved sawing-machine. Fig. 2 is an end elevation on a smaller scale. Fig. 3 is a sectional plan view on line 3 3, Fig. 2. Fig. 4 is a cross-section on line 4 4, Fig. 3. Fig. 5 shows a modification.

The base A is a heavy piece of timber of suitable size and shape, and it is provided with a transverse rock-shaft B turning in bearings $b$, and having at one end an arm $b'$ forming a treadle, as shown. At the other end of the shaft is an arm $b^2$ having two upwardly-projecting jaws $b^3$ adapted to fit on each side of the flange of a rail C, as shown in Figs. 3 and 4, and thus clamp the base A firmly upon the ties D when the workman presses his foot on the treadle $b'$.

Rising from the base A are two parallel uprights E, in the upper ends of which is journaled a transverse shaft F having a sprocket-wheel G secured thereto. The shaft may be turned by a crank H attached to one end thereof or by means of a chain belt connecting the shaft F with a power-shaft F' journaled in extensions of the uprights E, as shown in dotted lines in Fig. 2. In this case the crank or other means of imparting power will be attached to the power-shaft.

A frame I is hinged freely on the shaft F, being composed preferably of two parallel bars $i$ connected by cross-bars $i'$. At its outer end the frame carries a transverse arbor K parallel with the shaft F, and having secured to it a sprocket-wheel L and a circular saw M. A chain belt N connects the sprocket-wheels G and L.

Beside one of the bars $i$ is a standard O secured to the base A, and having an adjustable stop to limit the downward movement of the frame. The standard is preferably forked and has a series of holes to receive the transverse pin P, which serves as the stop, the bar $i$ playing between the arms of the fork.

One of the bars $i$ has an arm $i^2$ extending beyond the shaft F and carrying a sliding weight R, adjustable by means of a set-screw $r$ to partly counterbalance the weight of the saw and frame and keep the saw from feeding in too fast. If desired, this arm may be hinged to the bar $i$, so that when the frame is reversed to operate at the other end of the machine the arm will turn back on striking the cross-bars $e$, connecting the uprights E, as shown in Fig. 5.

The operation of my invention is as follows: The base A is placed so that the saw stands above the long tie D', which it is desired to cut off at the point indicated by the dotted lines. The jaws of the clamp are fitted under the flange of the rail and the treadle is pressed down. The pin P is then adjusted in the proper holes in the standard B. The saw is then lowered upon the tie and turned by means of the gearing until the tie is severed. The pin P prevents the saw from coming in contact with the ballast when the tie is cut through.

It will be seen that this machine can be used in many confined and awkward places where a crosscut-saw would be useless. The modification shown in Fig. 5 enables the saw to cut a tie at each end of the base without changing the position of the machine, thus reducing by one-half the number of times the machine has to be moved and adjusted for work.

Having thus described my invention, what I claim, and desire to secure by Letters Patent, is—

1. A portable sawing-machine for sawing railroad-ties in the track, having a base to rest on the ties, a clamp mounted on said base and projecting out at one side to engage with a rail, and a hinged frame carrying a circular saw and extending beyond the end of the base, substantially as described.

2. A portable machine for sawing railroad-ties, having a base, and a transverse rock-shaft journaled thereon provided with a treadle at one end and a forked arm at the other end to fit the flange of the rail, substantially as described.

3. A portable machine for sawing railroad-ties, having a base A, and a transverse shaft B mounted thereon, provided with rock-arms $b'\,b^2$, one being a treadle and the other having a pair of jaws $b^3$ to fit on each side of the rail-flange, substantially as described.

4. A portable sawing-machine, comprising a base and uprights, a shaft journaled in said uprights, a frame hinged at one end on said shaft and carrying a saw, an arm hinged to said frame and extending on the other side of said shaft from the saw, and an adjustable weight on said arm, substantially as described.

5. A portable sawing-machine, comprising a base and uprights, and a saw-carrying frame hinged to said uprights and adapted to be reversed in position, so as to bring the saw into operative position at either end of said base, said frame extending beyond the end of the base in either position, and adapted to carry the saw down below said base in order to cut through an adjacent tie in a railroad-track substantially as described.

In testimony whereof I affix my signature in presence of two witnesses.

JACOB HALL WHITFIELD.

Witnesses:
EDWARD A. FINEGAN,
CHARLES P. FORD.